E. S. ZUCK.
SYSTEM OF CONTROL FOR ELECTRIC MOTORS.
APPLICATION FILED JAN. 3, 1911.
1,110,094.
Patented Sept. 8, 1914.
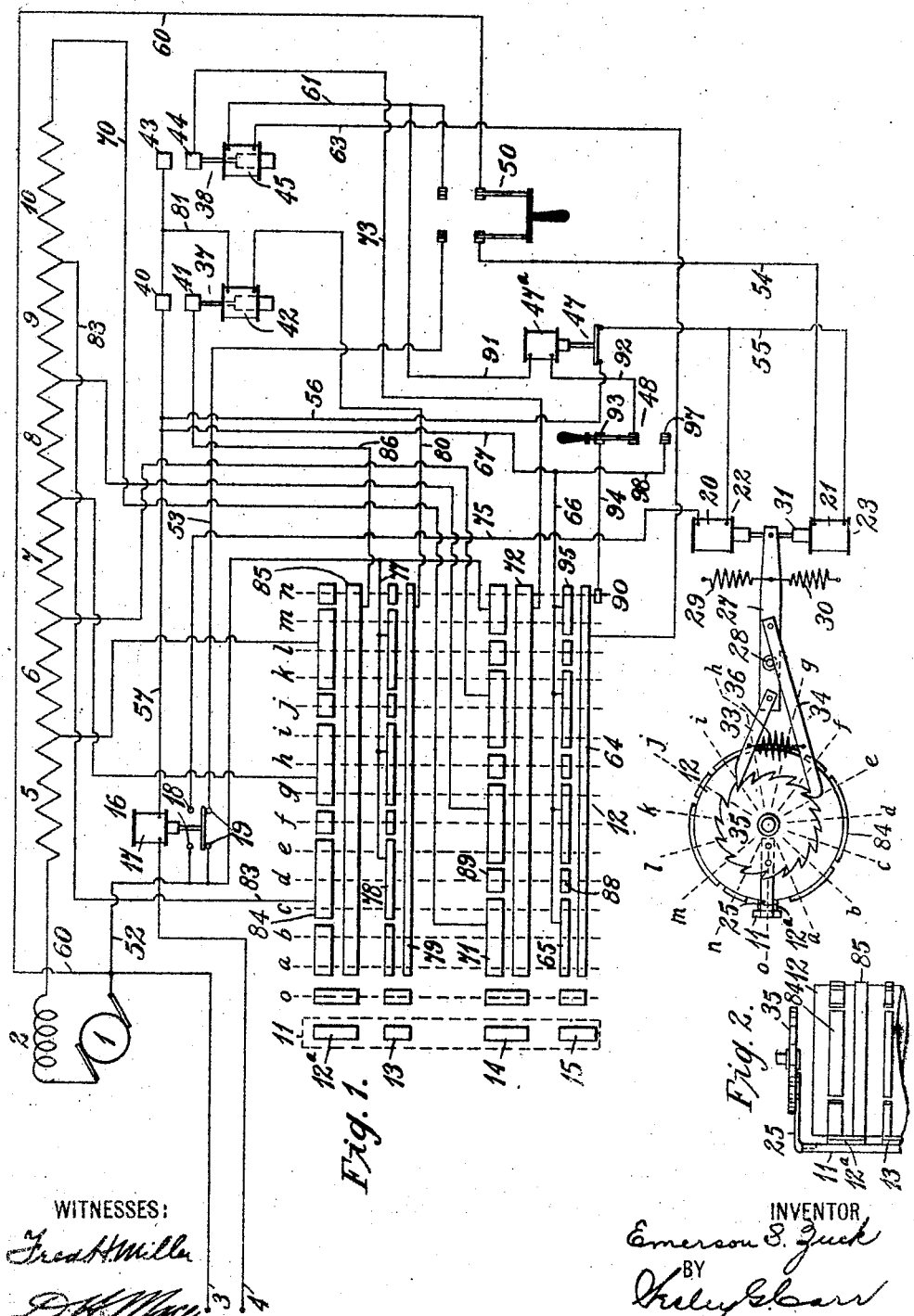
WITNESSES:
INVENTOR
Emerson S. Zuck
BY
ATTORNEY

UNITED STATES PATENT OFFICE.

EMERSON S. ZUCK, OF CLEVELAND, OHIO, ASSIGNOR TO WESTINGHOUSE ELECTRIC AND MANUFACTURING COMPANY, A CORPORATION OF PENNSYLVANIA.

SYSTEM OF CONTROL FOR ELECTRIC MOTORS.

1,110,094.      Specification of Letters Patent.      Patented Sept. 8, 1914.

Application filed January 3, 1911. Serial No. 600,571.

*To all whom it may concern:*

Be it known that I, EMERSON S. ZUCK, a citizen of the United States, and a resident of Cleveland, in the county of Cuyahoga and State of Ohio, have invented a new and useful Improvement in Systems of Control for Electric Motors, of which the following is a specification.

My invention relates to systems of control for electric motors and it has special reference to the control of motors used for industrial purposes, though it is also applicable to the control of electric railway motors.

One object of my invention is to provide an automatic system of control that shall be simple in arrangement and construction and shall embody the operating advantages of previous automatic control systems and the added advantage of reducing the number of unit switches to a minimum.

Another object is to provide selective means for "notching up" the controller automatically in accordance with predetermined current conditions of the motor circuit.

A still further object is to provide a control system that will not only automatically bring the motor up to a full running speed, but will also allow operation at any desired intermediate speed.

Usually, automatic operation is obtained by means of a master controller for governing the auxiliary circuits which control a plurality of main unit switches, so arranged as to close in a predetermined sequence and under predetermined conditions, such a system involving a complicated system of wiring and a relatively large number of unit switches.

According to my invention, I combine the auxiliary and main circuits on a stationary controller drum in such manner that the movable contact member, when rotated automatically by means of a ratchet and pawl mechanism and two electro-magnets, makes the necessary circuit connections through the unit switches, the contact terminals of the controller drum being so arranged that, by alternately changing connections from one unit switch to another, the circuit completions and interruptions may be handled by a minimum number of switches.

Obviously, my invention is not restricted to a stationary drum and movable member as any suitable relatively movable members may be employed for accomplishing the purpose.

The automatic features of my invention are secured by means of a series relay, adjusted for predetermined conditions and adapted to alternately energize two electromagnets, according as the motor current is greater or less than a predetermined value.

The common movable core of the magnets may be moved in one direction or the other, depending on which electro-magnet is energized, said movement being transmitted to the movable controller member by means of a suitable pawl-and-ratchet mechanism hereinafter described. The various motor circuits are thus automatically established as fast as the current conditions of the line are favorable. Inasmuch as the movable controller member is arranged to move in one direction only, I provide an auxiliary contact terminal which is so connected as to open the circuits of the energizing magnets when the controller member is in the last running position, thereby automatically preventing the further advance of said member into the "off" position. In a similar manner, it is only necessary to interrupt the above mentioned magnet circuits in order to allow operation at any intermediate position of the controller.

The Figure 1 of the accompanying drawing is a diagrammatic view of a system of automatic control which embodies my invention as applied to a single motor arranged to operate in one direction. Fig. 2 is an elevation of a portion of the controller and shows clearly the relation and operation of the movable controller member with respect to the ratchet and the controller drum.

Referring to the accompanying drawing, the reference numerals having the same significance in both figures, a motor having an armature 1 and field magnet winding 2, is connected to a source of power 3 and 4 through a plurality of resistance elements 5, 6, 7, 8, 9 and 10, the motor connections and the amount of resistance connected in circuit therewith being determined by the relative positions of the movable contact member 11 which coöperates with stationary controller drum 12, a development of which is shown. The movable contact member 11, having bridging contacts 12ᵃ, 13, 14 and 15, is arranged to successively occupy the positions indicated by the dotted lines *a* to *n*, in which positions the bridging contacts complete the connections between the plurality of contact members and ring segments which are mounted upon the stationary controller drum and establish the proper motor and auxiliary circuits.

The series relay 16, having a winding 17 and upper and lower contact terminals 18 and 19, is constructed and adjusted to energize the operating electromagnets 22 and 23, respectively, according as the current in the motor circuit exceeds or falls below a predetermined normal value; the movement of the common core member of these magnets being transmitted to the movable contact member of the controller by means of a paw-and-ratchet mechanism.

A lever arm 27, pivoted at 28 and held in a mid position by springs 29 and 30, is connected to the mid point of the common movable core 31 by a pin, pawls 33 and 34 being mounted upon the lever arm, at opposite sides of the pivot 28 in such manner that movement of the core 31 in one direction causes the ratchet 35 to be advanced by one pawl, while movement in the other direction advances the ratchet by means of the other pawl. The contact member 11 is secured rigidly to the ratchet 35 by a bar 25. The function of spring 36 is to maintain the pawls in engagement with the ratchet.

Two unit switches 37 and 38 having stationary contact terminals, movable contact terminals and energizing windings 40—41—42 and 43—44—45, respectively, are arranged to handle the "makes" and "breaks" of the motor circuits, as governed by the controller.

In conjunction with the electrically operated switch 47, which is normally in a closed position, is a single pole double throw switch 48, by means of which the switch 47 may be opened, thus breaking the circuit of the energizing magnets 22 and 23 and thereby preventing further movement of the controller member. The double pole single throw switch 50, is a master switch, the closure of which causes the motor to be automatically brought up to speed.

It will be evident to those skilled in the art, that the controller of my invention is equally adapted to manual operation, in which case the series relay, the operating pawl-and-ratchet mechanism, and the auxiliary switches 47, 48 and 50 may be dispensed with, the positions of the controller member then being controlled by the hand of the operator.

The operation of and connections for the system illustrated are as follows: With the motor at rest and the various pieces of apparatus occupying the positions shown in the drawing, the master switch 50 is closed to complete a circuit from the positive source 3 through conductor 52, lower contact terminals 19 of the series relay, conductor 53, switch 50, conductor 54, energizing winding 21 of electro-magnet 23, conductor 55, switch 47, conductor 56, conductor 57 and winding 17 of the series relay, to the negative side of the line. The circuit thus completed energizes electro-magnet 23 which causes the movable core 31 to be attracted and the lever arm 27 to move upon its pivot 28 in such a manner that the pawl 33 advances the ratchet 35, thereby moving controller member 11 into position *a*.

In the position *a*, a circuit is established from the source 3 through conductor 60, master switch 50, conductor 61, magnet winding 45 of the unit switch 38, conductor 63, ring segment 64, bridging contact terminal 15, ring segment 65, conductor 66, conductor 67, conductor 57 and series relay winding 17 to the negative side of the supply circuit. Completion of this circuit energizes the winding of unit switch 38 and causes it to close the motor circuit through all of the resistance sections 5, 6, 7, 8, 9 and 10, conductor 70, ring segment 71, bridging contact terminal 14, ring segment 72, conductor 73, moving contact terminal 44 and stationary contact terminal 43 of the unit switch 38, conductor 57 and series relay winding 17 to the negative supply line. As the motor is thus thrown upon the line, the excess motor current causes the series relay 16 to disengage lower terminals 19 and engage upper contact terminals 18, thus deenergizing the electro-magnet 23 and energizing electro-magnet 22 by way of conductor 52, upper contact terminals 18, conductor 75, winding 20 of electro-magnet 22, conductor 55, switch 47, conductors 56 and 57 and coil 17 to the negative line, as previously described. The electro-magnet 22 then causes the movable controller contact member to be advanced to position *b*, by means of the pawl 34 and the ratchet 35.

In position *b*, the circuit connections remain unchanged until the motor current drops below the value for which the series relay is adjusted. The relay then bridges its lower contact terminals 19, thus rendering the magnet 22 ineffective and energizing the magnet 23, through the devices bearing the following reference numerals: 52, 19, 53, 50, 54, 21, 55, 47, 56, 57 and 17 to the negative line.

The magnet 23, being again energized, causes the pawl 33 to advance the movable controller member 11 into position *c*, to establish connections through the energizing winding 42 of the unit switch 37 by way of devices 52, 77, 78, 13, 79, 80, 42, 81, 57 and 17. The closure of switch 37 completes the motor circuit through devices 1, 2, 5, 6, 7, 8, 9, 83, 84, 12ª, 85, 86, 41, 40, 57 and 17, and short-circuits the resistance element 10, whereupon the motor current suddenly increases and causes the series relay to engage its upper contacts 18, thus deënergizing magnet 23 and energizing magnet 22, as previously described, to advance the movable controller member to position $d$.

In moving into position $d$, the insulated terminals 88 and 89 open the circuits through the energizing winding 45 of the unit switch 38, and the motor circuit through resistance section 10, respectively, thus leaving the switch 38 open and resistance 10 entirely cut out of circuit. The circuit connections through unit switch 37 remain unchanged until the motor current decreases sufficiently to allow the series relay to be disengaged from its upper terminals 18 and to bridge its lower terminals 19, when magnet 23 is energized, as hereinbefore described, and controller member 11 advances to position $e$.

As the contact member occupies, successively, the positions $e$ to $n$, the resistance elements 9, 8, 7, 6 and 5 are gradually cut out of circuit until, in the last position $n$, the motor is connected directly across the source, with no resistance in series with it. A detailed description of the circuit and operations from the position $e$ to position $n$ is omitted on account of the similarity of such circuits and operations to those already described and the ease with which one skilled in the art can readily trace such circuits and note resulting operations.

In the last position $n$, the bridging contact member 15 engages the auxiliary terminal 90, thus causing a circuit to be established from the source 3, through devices 60, 50, 61, 91, 47ª, 92, 48, 93, 94, 90, 15, 95, 66, 67, 57 and 17 to the negative line, thus energizing the winding 47ª of switch 47 and causing said switch to open the circuit of the operating magnets 22 and 23, and consequently preventing further movement of the controller contact member.

To discontinue operation, switch 48 is opened to deënergize the winding 47ª of switch 47 and allow said switch to close and complete the circuit through the operating magnet 23, as previously described, controller contact member being thus advanced to its "off" position, after which the master switch 50 may be opened.

To operate at any intermediate position of the controller, it is only necessary to cause the switch 48 to make contact with contact terminal 97, in which case the winding 47ª of the switch 47 is energized by way of devices 60, 50, 61, 91, 47ª, 92, 48, 97, 98, 67, 57 and 17, and the switch is consequently opened, such action opening the circuit of the magnets 22 and 23 and preventing further movement of the controller contact member 11.

In order to continue from any intermediate operating position, the switch 48 is closed upon the contact terminal 93 to deënergize the winding 47ª of the switch 47 and allow said switch to reëstablish connections for the operating magnet 23 and thus restore the automatic operation of the controller.

While I have illustrated and described specific arrangements and connections of the apparatus, I desire it to be understood that the details of construction and relative arrangement of the devices may be materially varied from what is shown in the drawing and hereinbefore described without departing from the scope and spirit of my invention, and I further desire that only such limitations shall be imposed as are indicated in the appended claims.

I claim as my invention:

1. The combination with a controller comprising relatively stationary and movable coöperating members, of automatic selectively controlled electro-responsive means for alternately advancing the movable member through its successive steps.

2. The combination with a controller comprising relatively stationary and movable coöperating members, of automatic electro-responsive means for alternately advancing the said movable member through successive operating positions, said means comprising a plurality of actuating electro-magnets and a pawl-and-ratchet mechanism.

3. The combination with a controller comprising relatively stationary and movable coöperating members, of an electro-responsive means for automatically actuating the movable member step-by-step through successive operating positions, said means comprising a pawl-and-ratchet mechanism and a plurality of electro-magnets which are selectively energized according to current conditions of the motor circuit.

4. The combination with a controller comprising relatively stationary and movable coöperating members, of selectively controlled electro-responsive means of advancing the movable member through its successive positions, said means being dependent upon the current conditions of the motor circuit.

5. The combination with a controller comprising relatively stationary and movable coöperating members, of automatic electro-responsive means embodying a plurality of electromagnets for alternately advancing said movable member step-by-step through successive operating positions.

6. In a control system for electric motors, the combination with a supply circuit, a motor, a starting resistance therefor, and a plurality of independently operated switches for governing the motor circuits, of a controller comprising movable and stationary members which are adapted to provide the necessary circuit connections, electro-responsive means for advancing said movable member step-by-step through successive positions, and selective means dependent upon circuit conditions for alternately energizing said electro-responsive means.

7. In a control system for electric motors, the combination with a supply circuit, a motor, a starting resistance therefor, and a single pair of independently operated main switches, of a controller comprising relatively stationary and movable coöperating contact members for governing the circuit connections for said switches, and electro-responsive means for advancing said movable member through its successive positions.

8. In a control system for electric motors, the combination with a supply circuit, a motor, a starting resistance therefor, and a single pair of independently operated line switches, of a controller comprising relatively stationary and movable coöperating contact members for alternately governing the circuit connections of said pair of line switches.

9. In a control system for electric motors, the combination with a supply circuit, a motor and a starting resistance therefor, of a single pair of electro-responsive line switches, a governing controller comprising relatively stationary and movable coöperating contact members, and selectively controlled electro-responsive means for alternately advancing the member intermittently through its successive positions.

10. In a control system for electric motors, the combination with a supply circuit, a motor and a starting resistance therefor, of a single pair of independently operated line switches and a controller comprising relatively stationary and movable coöperating members for governing the connections of said switches.

11. The combination with a controller comprising relatively stationary and movable members and electro-responsive means for causing said controller to automatically govern the acceleration of an electric motor, of electro-magnetic means adapted to be energized when said movable member is in its last position for automatically interrupting the circuit of said electro-responsive means.

12. The combination with a controller comprising relatively stationary and movable coöperating members and electro-responsive means for alternately and selectively advancing the movable member through its successive positions, of an electrically operated switching device adapted to be automatically energized under predetermined conditions for preventing said movable controller member from advancing beyond its full running position.

13. The combination with a controller comprising relatively stationary and movable coöperating members, and a plurality of electro-magnets and a pawl-and-ratchet mechanism for advancing said movable member through its successive positions, of an electrically operated switching device adapted to open the circuit of said electro-magnets when the movable controller member is in its last position.

14. The combination with a controller comprising relatively stationary and movable coöperating members and electro-responsive means for automatically advancing the movable member through its successive positions, of an electrically operated switching device adapted to be automatically energized when the movable member is in its last operating position for interrupting the circuit of said electro-responsive means, and an auxiliary manually operated switching device for interrupting said circuit at any intermediate position.

In testimony whereof, I have hereunto subscribed my name this twentieth day of December 1910.

EMERSON S. ZUCK.

Witnesses:
 CHAS. E. SCHMELL,
 A. F. WOOD.